July 14, 1959 E. E. LOEBNER 2,895,054
SIGNAL RESPONSIVE CIRCUIT
Filed Dec. 31, 1956
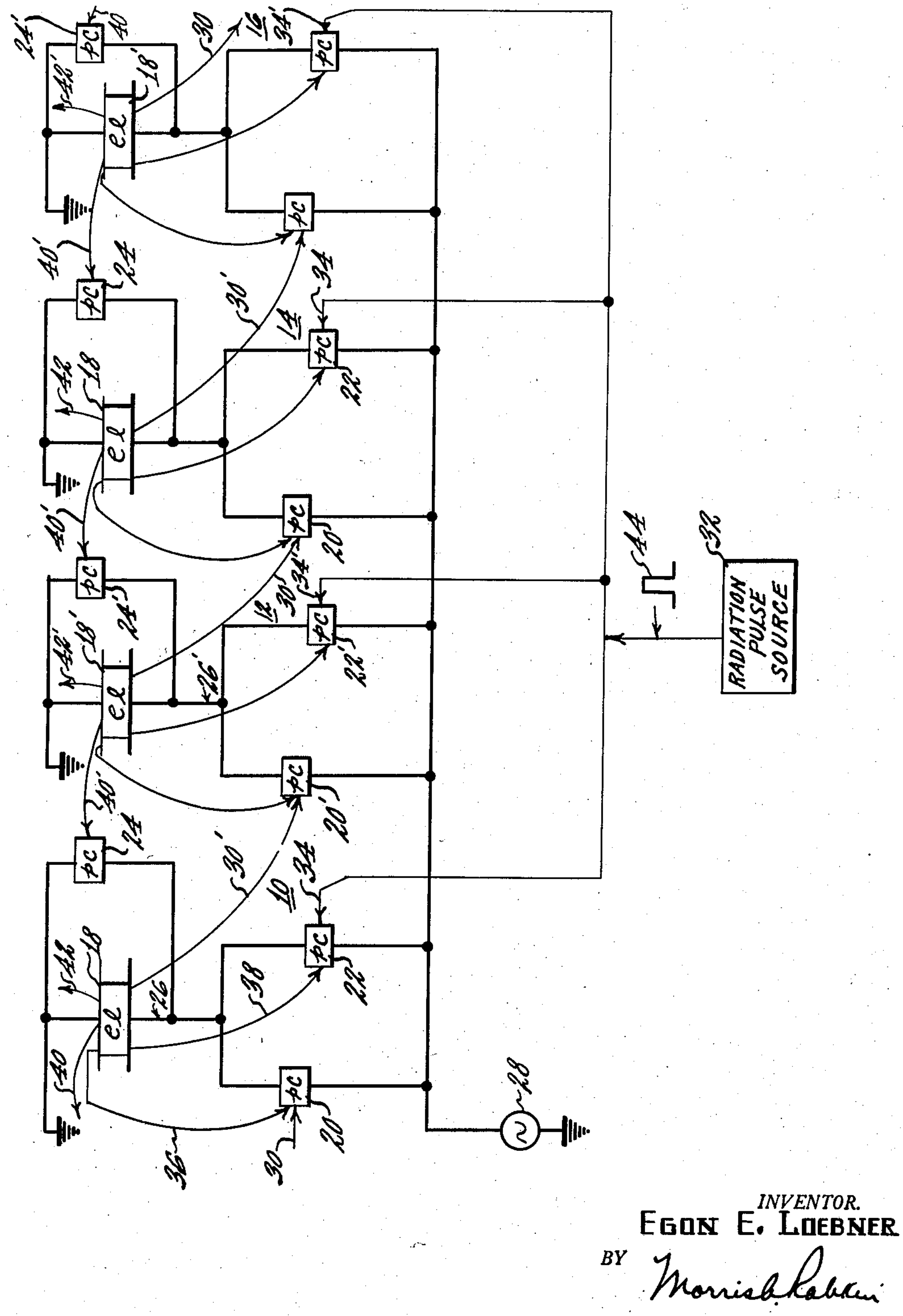
INVENTOR.
EGON E. LOEBNER
BY
ATTORNEY United States Patent Office 2,895,054

Patented July 14, 1959

2,895,054

SIGNAL RESPONSIVE CIRCUIT

Egon E. Loebner, Princeton, N.J., assignor to Radio Corporation of America, a corporation of Delaware Application December 31, 1956, Serial No. 631,530

7 Claims. (Cl. 250—213)

This invention relates to signal responsive circuits in which the signals may be in a form of visible or near-visible radiation.

Circuits in which the signals are in the form of visible or near-visible radiation are described in the article "Opto-Electronic Devices and Networks" by E. E. Loebner in the Proceedings of the I.R.E., December 1955, at page 1897. As described in that article, information handling devices and circuits that are based on light radiation signals may be formed from combinations of electroluminescent and photoconductor cells. This phenomenon, known as electroluminescence, is one occurring in certain phosphor materials that may be caused to emit visible or near-visible radiations by subjecting them to electrical fields, for example, to alternating electrical fields of certain magnitude and frequency. A photoconductor is a material which has the property of an electrical impedance that changes in response to incident radiations.

It is among the objects of this invention to provide:

A new and improved signal responsive circuit in which the signals may be in the form of visible or near-visible radiations;

A new and improved pulse responsive circuit employing electroluminescent and photoconductive cells;

A new and improved pulse responsive circuit that may be used as a ring counter.

In accordance with this invention, a plurality of stages are provided, each stage of which includes a means for generating radiations and a plurality of radiation-responsive means. In each stage, the radiation-generating means is connected in a series circuit with one of the radiation-responsive means, and another radiation-responsive means is connected in shunt with the radiation-generating means. The radiation from the generating means of one stage is supplied to the shunt responsive means of another stage. Thereby, one stage may be used to control the energization of the radiation-generating means of another stage.

The foregoing and other objects, the advantages and novel features of this invention, as well as the invention itself both as to its organization and mode of operation, may be best understood from the following description when read in connection with the accompanying drawing in which like reference numerals refer to like parts, and in which the sole figure is a schematic circuit diagram of an opto-electronic device embodying this invention.

In the single figure, a ring counter is shown, having a plurality of stages 10, 12, 14, and 16. The principles of this invention are equally applicable to any number of stages. Corresponding numerals are used to reference corresponding parts; the numerals in the even-position stages 12, 16 are the same as those in the odd-position stages 10, 14, but with the addition of a prime ('). The stages are generally the same in construction and in operation.

In the first stage 10, there is an element 18 for generating visible or near-visible radiation; this element is shown as an electroluminescent cell (*el*), which may be made of a material such as a zinc sulphide phosphor. The first stage 10 also includes three elements 20, 22, 24 that are responsive to such radiations; these radiation-responsive elements are shown as photoconductive (*pc*) cells 20, 22, and 24, which may be made of a material such as a cadmium sulphide crystal. Two of the *pc* cells 20 and 22 are connected in parallel with each other and in a series combination 26 with the *el* cell 18. One terminal of the *el* cell 18 is connected to a reference potential shown by the conventional ground symbol. The *pc* cell 24 is connected between ground and the junction 26 of the *el* cell 18 and the other *pc* cells 20 and 22. The other terminals of the *pc* cells 20 and 22 are connected to one terminal of a source 28 of electric potential (which source may be alternating or direct, depending upon the type of *el* cells that are used). The other terminal of the source 28 is returned to ground. Thus, the source 28 is connected across the series combination 26, and the *pc* cell 24 is connected in shunt with the *el* cell 18.

The *pc* cell 20 receives radiations from the *el* cell 18 of a fourth stage 16 via a light channel or photoduct 30. The *pc* cell 22 receives radiations from a source 32 via the photoduct 34. The *el* cell 18 supplies radiations to the *pc* cells 20 and 22 via the photoducts 36 and 38. The *el* cell 18 of the first stage 10 supplies radiation via the photoduct 40 to the *pc* cell 24' of the fourth stage 16. The *pc* cell 24 of the first stage 10 receives radiation via the photoduct 40' from the *el* cell 18' of the second stage 12. The *pc* cell 20' of the second stage 12 receives radiation from the *el* cell 18 of the first stage 10 via the photoduct 30'. The second stage 12 is coupled to the third stage 14, and the third stage 14 is coupled to the fourth stage 16 in similar fashions.

An explanation of the operations of elements 18, 20, and 22, as a "radiation amplifier," and as a bistable device having a hysteresis characteristic, is presented in the above-cited article by Loebner.

In operation, in the absence of radiation in the associated photoducts, each *pc* cell 20, 22, and 24, presents a high impedance to current from the electrical source 28, and a low impedance when each such *pc* cell receives radiation of a certain wavelength and intensity to which it is responsive. In the absence of radiation in the photoducts 30, 34, 36, and 38, the *pc* cells 20 and 22 are both in the high-impedance condition, and a relatively small part of the voltage of the source 28 is applied across the *el* cell 18. Under those circumstances, the voltage across the *el* cell 18 is insufficient for this cell to generate radiation of substantial intensity. Likewise, when only one of the *pc* cells 20 or 22 is in the low-impedance condition, and the other *pc* cell is in the high-impedance condition, the resultant impedance of the parallel combination of the two *pc* cells 20 and 22 is such that an insufficient voltage appears across the *el* cell 18 for this cell to generate radiation of substantial intensity.

When both *pc* cells 20 and 22 receive radiation to which they are responsive, via the photoducts 30 and 34, respectively, their resultant impedances in series with the *el* cell 18 is such that a substantial part of the voltage of the source 28 is applied across that *el* cell 18, and that cell 18 starts to generate a substantial radiation. This radiation generated by the *el* cell 18 is fed back by the photoducts 36 and 38 to the *pc* cells 20 and 22. This feedback radiation via the photoducts 36 and 38 is in a regenerative direction tending to drive the cells 20 and 22 further towards the low-impedance condition. Due to gain in the *pc* cells 20 and 22 (a large change of impedance with a relatively small change in radiation input), this regenerative action, once started, continues until the feedback radiation in photoducts 36 and 38 is at a saturation level, which is sufficient to maintain the *pc* cells 20 and 22 in the low-impedance condition, and, thereby, to maintain the *el* cell 18 in a radiation-generating (or "on") condition. This feedback radiation is sufficient to maintain the series combination 26 in the stable on-condition after the input radiation in the photoducts 30 and 34 cease.

The operation described thus far takes place during the absence of radiation in the photoduct 40′ to the shunt *pc* cell 24; which circumstance results in this shunt *pc* cell 24 being in the high-impedance condition. The first stage 10 remains in this stable on-condition until control radiation is supplied to the photoduct 40′ and received by the shunt *pc* cell 24. When this radiation is received by the shunt *pc* cell 24, this cell 24 is changed to the low-impedance condition. Generally, the impedance relationships of the *pc* and *el* cells are as follows: When radiation is not applied to a *pc* cell in this circuit, the *pc* cell is in the high-impedance condition and has an impedance that may be at least as much as several orders of magnitude greater than the *el* cells; when such a *pc* cell is in the low-impedance condition due to applied radiation, the impedance of the *el* cell may be several orders of magnitude greater than that of that *pc* cell. Due to these impedance relationships, and due to the very low impedance of the illuminated *pc* cells, it may be desirable to include resistors (not shown) in each of the shunt paths that include the *pc* cells 24 and 24′, respectively.

When such a shunt *pc* cell receives radiation via the associated photoduct 40′, the voltage across the *el* cell 18 is substantially reduced due to the reduced shunt impedance of the *pc* cell 24. As the voltage is reduced across the *el* cell 18, the energizing current in that cell 18 is likewise reduced, resulting in a substantial decrease in the feedback radiation from that cell 18. The intensity of the generated radiation from the *el* cell 18 may vary in accordance with about the third power of the energizing current. This decrease in feedback radiation, in turn, results in an increase of the impedance of the *pc* cells 20 and 22, and therefore, a further decrease in energizing current for the *el* cell 18. Thus, a regenerative feedback action in the "off" direction takes place in the series combination 26 with the increasing impedance of the *pc* cells 20 and 22. This feedback action continues until the *el* cell 18 is extinguished. At that time, the *pc* cells 20 and 22 are in the high-impedance condition, and the series combination 26 is in a stable off-condition.

This off-condition continues until input radiation in the photoproducts 30 and 34 trigger the *pc* cells 20 and 22 to the low-impedance condition, to drive the *el* cell 18 to a radiation-generating condition. The operation described above is then repeated. The other stages 12, 14, and 16, operate in a similar fashion.

Each stage of the circuit may be used to store binary signals, which signals may be in the form of a pulse of radiation (in the spectral range of sensitivity of the *pc* cells 20 and 22′) and the absence of such a pulse respectively representing the binary digits "1" and "0." These digits "1" and "0" (as well as an input pulse in the absence of a pulse) may also be represented by the on- and off-conditions, respectively, of the circuit. These on- and off-conditions of the circuits 10, 12, 14, and 16, may be separately detected by output photoducts 42 and 42′, respectively, connected from the *el* cells 18, 18′ of these stages.

In the operation of the entire ring counter, one of the stages 10, 12, 14, or 16, is in the on-condition, and the remaining stages are in the off-condition at any one time. Assume that initially the first stage 10 is the only one in the on-condition. Such initial conditions may be readily brought about in various ways, for example, by applying radiation to the shunt *pc* cell 24′ and 24 of the stages 12, 14, and 16, and by applying radiation pulses to the *pc* cells 20 and 22 of the first stage 10.

When the first stage 10 is in the on-condition, radiation from the *el* cell 18 is fed via the photoducts 36 and 38 to the *pc* cells 20 and 22 of that stage 10, and, also, via the photoducts 40 to the *pc* cell 24′ of the fourth stage 16. In addition, the *el* cell 18 provides radiation in the photoduct 30′ to the *pc* cell 20′ of the second stage 12. Thus, during the time that the stage 10 is in the on-condition, radiation is continuously supplied to the *pc* cell 20′ of the second stage 12 to place that *pc* cell 20′ in low-impedance condition, which primes that second stage 12.

The radiation pulse 44 from the source 32 is supplied to the photoducts 34 and 34′ simultaneously. The radiation applied to the *pc* cell 22′ of the second stage 12 places that *pc* cell 22′ in the low impedance condition at the same time that the *pc* cell 20′ of the second stage 12 is in the low-empedance condition. Accordingly, a substantial voltage is supplied to the *el* cell 18′, and that cell 18′ of the second stage 12 starts to generate radiation. Thus, the stage 12 is driven to the on-condition, and remains in that condition after the pulse 44 from the source 32 terminates.

Radiation from the *el* cell 18′ of the second stage 12 is supplied by the photoduct 40′ to the shunt *pc* cell 24 of the first stage 10. The application of radiation to this *pc* cell 24 turns the first stage to the off-condition as the second stage 12 is turned on. Thus, the application of a pulse 44 to the photoducts 34 and 34′ turns the next, or primed, stage to the on-condition, which action, in turn, turns the preceding stage to the off-condition.

As the *el* cell 18′ of the second stage 12 is turned to the on-condition, radiation is supplied via the photoduct 30 to the *pc* cell 20 of the third stage 14. This *pc* cell 20 of the third stage 14 may receive radiations by the photoduct 30 during the time that the radiation pulse 44 is applied to the photoduct 34 of that third stage 14. Any false or improper triggering of the third stage 14 to the on-condition may be prevented by using a photoconductor material having a relatively slow-response time for the *pc* cell 20 and a photoconductor material having a relatively fast response time for the *pc* cell 22. Under these circumstances, the *pc* cell 22 has very little storage effect and is effectively in the low-impedance condition only during the time that the pulse 44 is being applied to the photoduct 34. However, the *pc* cell 20 requires a substantial build-up time of the order of approximately the time for the *el* cell 18′ of the second stage to be turned to the radiation-generating condition, so that the pulse 44 terminates before that *pc* cell 20 is primed to the low-impedance condition by the *el* cell 18′. Therefore, even though the *pc* cell 20 receives radiation during the pulse 44, that *pc* cell 20 remains in the high-impedance condition until after the pulse 44 terminates.

These different response times for the *pc* cells 20 (20′) and 22 (22′), respectively, may be provided in the following way: The *pc* cells 20, 20′, 22, 22′, may be formed of the same type of material. The light intensity of the radiation pulses 44 from the source 32 to the *pc* cells 22, 22′ is made greater than that of the light transferred to the *pc* cells 20, 20′ from the *el* cells 18′ and 18, respectively. Generally, due to these relative light levels, the speed of response of the *pc* cells 20 and 20′ is correspondingly less than that of the *pc* cells 22 and 22′. To maintain consistent impedance relationships between the cells 20 (20′) and 22 (22′) the cells 20 and 20′ are made more sensitive than the cells 22 and 22′, that is, the cells 20 and 20′ are made to have a greater increase in conductance for the same amount of light change. Differences in the parameters of preparation of the material may be used to provide the desired sensitivities.

The second pulse 44 turns the third stage 14 to the on-condition, which, in turn, causes the second stage 12 to be turned to the off-condition, in the manner described above. The third pulse from the source 32, in a similar fashion, turns the fourth stage to the on-condition; and the fourth pulse 44 turns the first stage to the on-condition to restore the circuit to its initial condition. Thus, the circuit operates as a ring counter or frequency divider circuit and is restored to its initial condition for each four trigger pulses 44 that are received from the source 32. Radiation is supplied to the output photoduct 42 of the first stage 10 after each four pulses 44 from the source 32. A ring counter of any desired number of positions may be provided in a similar manner.

Suitable constructions for the circuit of this invention are known to one skilled in the art. A construction of a similar type of *el–pc* circuit is described in the copending patent application, Serial No. 631,602, filed December 31, 1956, of E. E. Loebner, which is assigned to the assignee of this application.

Accordingly, a new and improved signal responsive circuit is provided in which the signals are in the form of visible or near-visible radiation. Particularly, this signal responsive circuit may be used as a ring counter for handling such radiation signals in the form of pulses.

What is claimed is:

1. An opto-electronic device comprising a plurality of stages, each of said stages individually including a radiation generating means and a plurality of radiation responsive means providing variable impedances, means for energizing a first electrical series combination that includes said radiation generating means and a first one of said variable impedance means, and means for connecting a second one of said variable impedance means electrically in parallel with said radiation generating means, said device further comprising means for coupling said radiation generating means of one of said stages to one of said parallel variable impedance means of another one of said stages.

2. An opto-electronic device comprising a plurality of stages, each of said stages individually including a radiation generating means and a plurality of radiation responsive means providing variable impedances, means for energizing a first electrical series combination that includes said radiation generating means and a first one of said variable impedance means, means for regeneratively coupling said radiation generating means optically to said first variable impedance means, and means for connecting a second one of said variable impedance means electrically in parallel with said radiation generating means, said device further comprising means for coupling said radiation generating means of one of said stages to one of said parallel variable impedance means of another one of said stages.

3. An electroluminescent device comprising a plurality of stages; each of said stages including individually an electroluminescent element, a plurality of photoconductive elements, means for energizing a first electrical series combination that includes said electroluminescent element and a first one of said photoconductive elements, means for connecting a second one of said photoconductive elements in parallel with said electroluminescent element; said device further comprising means for optically coupling said electroluminescent element of one of said stages to said parallel photoconductive element of another one of said stages.

4. An electroluminescent device comprising a plurality of stages; each of said stages including individually an electroluminescent element, a plurality of photoconductive elements, means for energizing a first electrical series combination that includes said electroluminescent element and a first one of said photoconductive elements, means for optically coupling said electroluminescent element to said first photoconductive element, means for connecting a second one of said photoconductive elements in parallel with said electroluminescent element; said device further comprising means for optically coupling said electroluminescent element of one of said stages to said parallel photoconductive element of another one of said stages.

5. An electroluminescent device comprising a plurality of stages, each of said stages including individually an electroluminescent element and a plurality of photoconductive elements, means for energizing a first electrical series combination that includes said electroluminescent element and a parallel combinaton of a plurality of said photoconductive elements, and means for connecting another one of said photoconductive elements electrically in parallel with said electroluminescent element, said device further comprising means for optically coupling said electroluminescent element of a first one of said stages to one of said parallel photoconductive elements of a second one of said stages, and means for optically coupling said electroluminescent element of said second stage to said aonther photoconductive element of said first stage.

6. An electroluminescent device comprising a plurality of stages, each of said stages including individually an electroluminescent element and a plurality of photoconductive elements, means for energizing a first electrical series combination that includes said electroluminescent element and a parallel combination of a plurality of said photoconductive elements, and means for connecting another one of said photoconductive elements electrically in parallel with said electroluminescent element, said device further comprising means for optically coupling said electroluminescent element of a first one of said stages to one of said parallel photoconductive elements of a second one of said stages, means for optically coupling said electroluminescent element of said second stage to said another photoconductive element of said first stage, and means for applying radiation pulses to the other of said parallel photoconductive elements of said second stage and to one of said parallel photoconductive elements of said first stage.

7. An electroluminescent ring counter device comprising a plurality of stages, each of said stages including individually an electroluminescent element and a plurality of photoconductive elements, means for energizing a first electrical series combination that includes said electroluminescent element and a parallel combination of a plurality of said photoconductive elements, and means for connecting another one of said photoconductive elements electrically in parallel with said electroluminescent element, said device further comprising means for optically coupling said electroluminescent element of a first one of said stages to one of said parallel photoconductive elements of a second one of said stages, means for optically coupling said electroluminescent element of said second stage to said another photoconductive element of said first stage and to one of said parallel photoconductive elements of a third one of said stages, means for optically coupling said electroluminescent element of a last one of said stages to said another photoconductive element of a preceding one of said stages and to one of said parallel photoconductive elements of said first stage, and means for applying radiation pulses to the others of said parallel photoconductive elements of said stages.

References Cited in the file of this patent

Loebner: "Opto-Electronic Devices and Networks," Proceedings of the I. R. E., pages 1897 to 1906.